United States Patent [19]

Scherf

[11] Patent Number: 5,527,084
[45] Date of Patent: Jun. 18, 1996

[54] COLLAPSIBLE ARM REST, DOOR INTERIOR TRIM PANEL AND ARM REST SUPPORT ASSEMBLY

[75] Inventor: Ansgar P. T. Scherf, Tcking, Germany

[73] Assignee: Ceats, Grosse Pointe Farms, Mich.

[21] Appl. No.: 380,055

[22] Filed: Jan. 30, 1995

[51] Int. Cl.[6] ............................................. B60J 9/00
[52] U.S. Cl. ...................... 296/153; 108/152; 248/118; 280/751; 296/189; 297/411.21
[58] Field of Search ........................ 296/153, 189; 280/751, 748; 297/411.21; 248/118; 108/152

[56] References Cited

U.S. PATENT DOCUMENTS

| | | | |
|---|---|---|---|
| 872,941 | 12/1907 | Hunt | 108/152 X |
| 3,362,749 | 1/1968 | Clement | 297/411.21 |
| 3,387,881 | 6/1968 | Stepanek et al. | 296/153 |
| 3,400,979 | 9/1968 | James | 297/412 |
| 4,592,584 | 6/1986 | White, Jr. | 296/153 |
| 4,783,114 | 11/1988 | Welch | 296/153 |
| 4,869,543 | 9/1989 | Grimes | 297/411.21 X |
| 5,181,759 | 1/1993 | Doolittle | 294/153 |
| 5,395,161 | 3/1995 | Spykerman et al. | 297/411.21 X |

FOREIGN PATENT DOCUMENTS 1-197137  8/1989  Japan .

*Primary Examiner*—Dennis H. Pedder
*Assistant Examiner*—Kia M. Robinson
*Attorney, Agent, or Firm*—Reising, Ethington, Barnard & Perry

[57] ABSTRACT

An arm rest support (20) has a mounting plate section (22) mounted onto a inner door panel (12) of a motor vehicle door (10). The mounting plate section (22) has a thickened bar section (30) which has a plurality of ribs (32) upwardly extending and inwardly extending therefrom. Each rib (32) is angularly displaced with respect to the other ribs. A top plate (40) is seated onto the distal ends (36) of the ribs and connected to a flange (52) of the mounting plate section (22). A door trim panel (18) incorporating an arm rest section (19) is mounted onto the door inner panel (12). The arm rest section (19) is shaped to form a cavity (68) to receive the support (20) and top plate (40). The support (20) and top plate (40) in the arm rest section (19) resist against downwardly directed forces while permitting collapse of the arm rest section in the outboard direction.

19 Claims, 2 Drawing Sheets

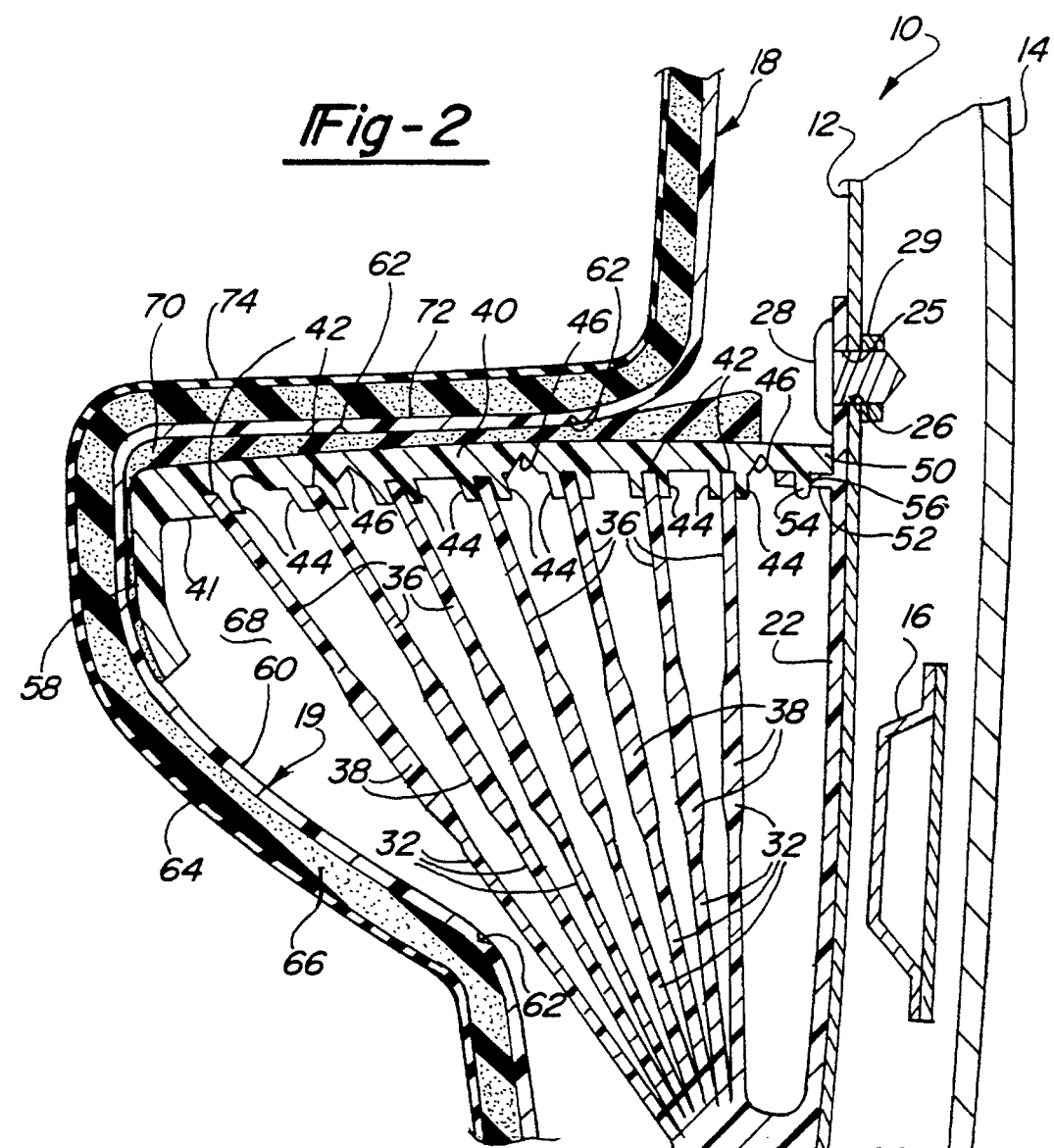

5,527,084

COLLAPSIBLE ARM REST, DOOR INTERIOR TRIM PANEL AND ARM REST SUPPORT ASSEMBLY

TECHNICAL FIELD

The field of this invention relates to a collapsible arm rest for a vehicular door.

BACKGROUND OF THE DISCLOSURE

It is well known to provide an arm rest for a motor vehicle door wherein the arm rest is integrated into a decorative door trim panel assembly mounted on the inner panel of the door.

The arm rest in such a door panel is strong enough to support the weight of an arm thereon and also to allow the arm rest to function as a door pull when an occupant pulls on the arm rest to close the door. Often the arm rest includes a recess to allow the arm rest to function as a door pull. It is also well known to provide an arm rest that collapses laterally in the horizontal direction upon imposition of a large horizontally directed force which can be exerted during a collision impact against the arm rest. The collapsing arm rest absorbs energy and provides for a flatter contour against the occupant.

It has become known that people also use the arm rest as a step. People commonly stand on the arm rest for various purposes, e.g. reaching onto the roof of the vehicle. This is particularly common for larger and taller vehicles such as trucks for semi-trailers or large vans. When the arm rest has a flat horizontally extending upper surface, the tendency to use the arm rest as a step is further promoted. The arm rests that are integrally formed with the decorative inner door trim panel must therefore be designed and structured to take the weight of a person, otherwise the door trim panel may be damaged while a person is standing on the arm rest.

What is needed is an arm rest that can be used as a step that supports the weight of a person when a person is standing on the arm rest while permitting energy absorbing collapse of the arm rest upon the exertion of large horizontally directed forces.

SUMMARY OF THE DISCLOSURE

In accordance with one aspect of the invention, an arm rest assembly for a vehicle door includes an arm rest support having a section mounted on a door panel and a plurality of laterally spaced ribs upwardly and inwardly extending from the mounted section to laterally spaced distal upper ends. In one embodiment, the arm rest support is made from extruded plastic.

The mounted section of the door support is in the form of a mounting plate. A lower section of the mounting plate has a thickened bar section that horizontally extends along a lower section of the plate. The plurality of laterally spaced ribs upwardly extend from a top of the bar end to laterally spaced distal upper ends. The plurality of ribs fan out from the bar section such that each rib is angled with respect to another rib. Each rib having its horizontal axis extending substantially parallel to the mounting plate and to each other.

A door trim panel preferably has an integral arm rest and is positioned to cover the arm rest support and its distal upper ends. The door trim panel is preferably made from a foam cushion filler, supportive substrate and outer cosmetic skin covering.

Preferably, a top plate is seated on the distal upper ends of the spaced ribs. The outboard end of the top plate abuts against the supportive shoulder to prevent outboard motion of the top plate and ribs under normal circumstances. The top plate has at its lower facing surface a plurality of grooves that seatably receive the distal upper ends of the spaced ribs. For proper seating and noise reduction, a compressible foam layer is interposed between the top plate and the substrate of the arm rest section of the interior door trim panel. In an alternate embodiment, a plurality of rib receiving grooves are integrally formed in the substrate of the arm rest section of the interior door trim panel.

In accordance with another aspect of the invention, an arm rest support member has a mounting plate for mounting on a door panel. The mounting plate has a thickened bar section that horizontally extends along a lower section of said plate. A plurality of laterally spaced ribs upwardly extending from the bar and fan out from the bar section such that each rib is angled with respect to another rib and the distal ends of the ribs are spaced apart. Each rib has its horizontal axis extending substantially parallel to the mounting plate.

In accordance with still another aspect of the invention, an arm rest support for a vehicle door includes a plurality of ribs having proximate ends integrally formed and connected together. The plurality of ribs fan out from the proximate ends such that each rib is angled with respect to another rib. The ribs have upper distal ends spaced apart from each other. Each respective rib has a respective horizontal axis extending substantially parallel to each other.

Preferably, a top plate is seated on the distal upper ends of the spaced ribs. The top plate has longitudinally extending break lines that allow the plate to buckle in a controlled fashion toward the inner door panel.

The arm rest support provides support for the arm rest against downwardly exerted forces such as ones encountered by the weight of a person standing on the arm rest. The arm rest support also has ribs which yield upon imposition of a predetermined force such as one that occurs during a collision impact that is directed laterally outboard against the arm rest by the seated occupant whereby the arm rest is collapsed from the outboard directed lateral force and absorbs energy during the collapse and provides a flatter contour facing the vehicle interior.

BRIEF DESCRIPTION OF THE DRAWINGS

Reference now is made to the accompanying drawings in which:

FIG. 2 is rear elevational and sectioned view taken through a fully assembled door and arm rest that illustrates the arm rest and arm rest support in the normal use condition;

FIG. 4 is a fragmentary and fragmented view similar to FIG. 2 showing an alternate embodiment.

DETAILED DESCRIPTION OF THE PREFERRED EMBODIMENT

Figure 1:
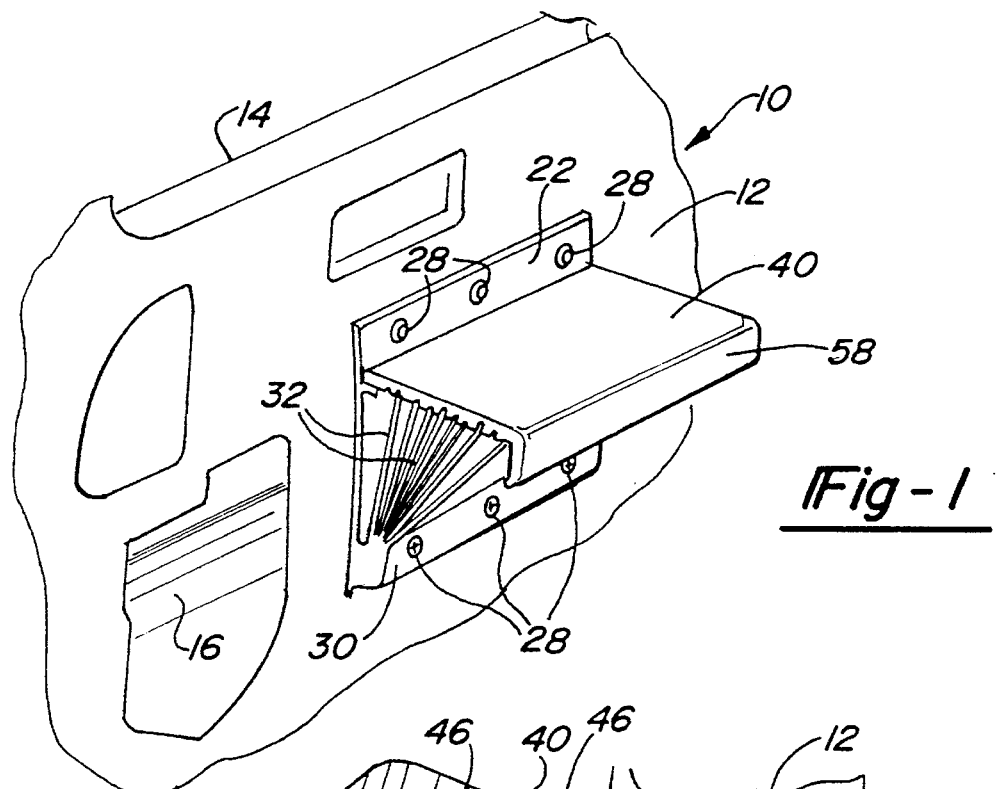
FIG. 1 is a perspective view of a vehicle door having the interior door trim panel removed to show the arm rest support and top plate mounted on the inner door panel in accordance with one embodiment of the invention.

Referring now to FIGS. 1 and 2, a vehicle door 10 includes an inner door panel 12 and outer panel 14 which are conventionally attached together in spaced apart relation to accommodate a window regulator (not shown), door latching components (not shown), and guard rail 16. An interior door trim panel 18 that incorporates arm rest section 19 is conventionally mounted to the inner door panel 12 as illustrated in FIG. 2. An arm rest support 20 is mounted to the inner door panel 12 and is received inside the arm rest section 19 as the interior door trim panel is installed in place.

The arm rest support 20 is made from extruded plastic that has desirable impact behaviors, namely low brittleness and good cold weather properties. EPDM modified polypropylene, pcabs, nylon, abs, or polyamide are suitable and commercially available materials. The arm rest support 20 has a mounting plate 22 which has apertures 24 and 25 therethrough that align with apertures 26 and 27 in the inner door panel 12 to receive fasteners 28 as shown in FIG. 2 to securely mount the arm rest support 20 to the inner door panel. Complementary fasteners 29 may be used on the backside of the inner panel 12 to provide strength about holes 26 and 27 in panel 12 and to help secure the mounting plate 22 affixedly against the panel 12.

The mounting plate 22 has a thickened bar section 30 at a lower section thereof. Apertures 24 extend through the thickened bar section 30. The bar 30 has several integral ribs 32 angularly extending upwardly and inwardly from the bar 30. The ribs 32 have their lower proximate ends 34 integrally formed with bar 30. The ribs 32 are each angled with respect to the other ribs to form a fanning out to the distal ends 36. The distal ends 36 are contained in generally a horizontal plane. The ribs 32 each have a thickened midsection 38 for providing structural stability against downwardly directed forces. The ribs 32 are positioned such that their respective longitudinal horizontal axes are substantially parallel to the arm rest support 20 and to each other.

A top plate 40 sits on the distal ends 36 of ribs 32. The plate 40 at its undersurface 41 has a series of grooves 42 formed between parallel ridges 44 that receive and seat the distal ends 36. Several parallel break lines 46 are formed in the top plate between sequential grooves 42 to provide controlled buckling of top plate. The break lines 46 take the form of grooves placed in the undersurface 41 of top plate 40. The outer lateral edge 50 of the top plate 40 is mounted to a horizontal flange 52 in the mounting plate 22 via a pin 54 and aperture 56 interlock. The lateral outer edge 50 of the plate 40 also abuts the mounting plate 22. The top plate 40 also has a downwardly extending abutment flange 58.

The interior door trim panel 18 has a supportive substrate 60 with break lines 62 in arm rest section 19. A cosmetic skin covering 64 overlies the substrate 60. A foam cushion filler 66 is interposed between the cosmetic skin 64 and substrate 60 at the arm rest section 19. The substrate at the arm rest section 19 forms a cavity 68 that is sized and shaped to receive the support member 20 and top plate 40 as shown in FIG. 2. A foam layer 70 is interposed and compressed between the top plate 40 and the substrate 60. The foam layer 70 provides a resilient downward force on top plate 40 to assure that it remains properly seated on ends 36 of support 20. It also reduces squeaking and rattling that may occur between the top plate 40 and substrate 60.

In normal use, the arm rest support 20 and top plate 40 remain stationary as illustrated in FIGS. 1 and 2. The support 20 and plate 40 are able to resist significant downwardly directed forces. When a person steps on the arm rest horizontal surface 74 of arm rest section 19, the support 20 and top plate 40 prevent any undesirable downward motion of the arm rest with respect to the rest of the interior trim panel 18. The ribs 32 are also prevented from flexing outwardly because distal ends 36 are seated into top plate 40 and top plate 40 abuts against fixed mounting plate 22. Pin 54 can also provide lateral support for top plate 40. The pin 54 also prevents flexing of the ribs 32 outwardly from mounting plate 22. The arm rest section 19 withstands the weight of the person during normal use. The arm rest section also withstands smaller but more common and constant downwardly directed forces exerted by the weight of a resting arm exerted thereon.

Figure 3:
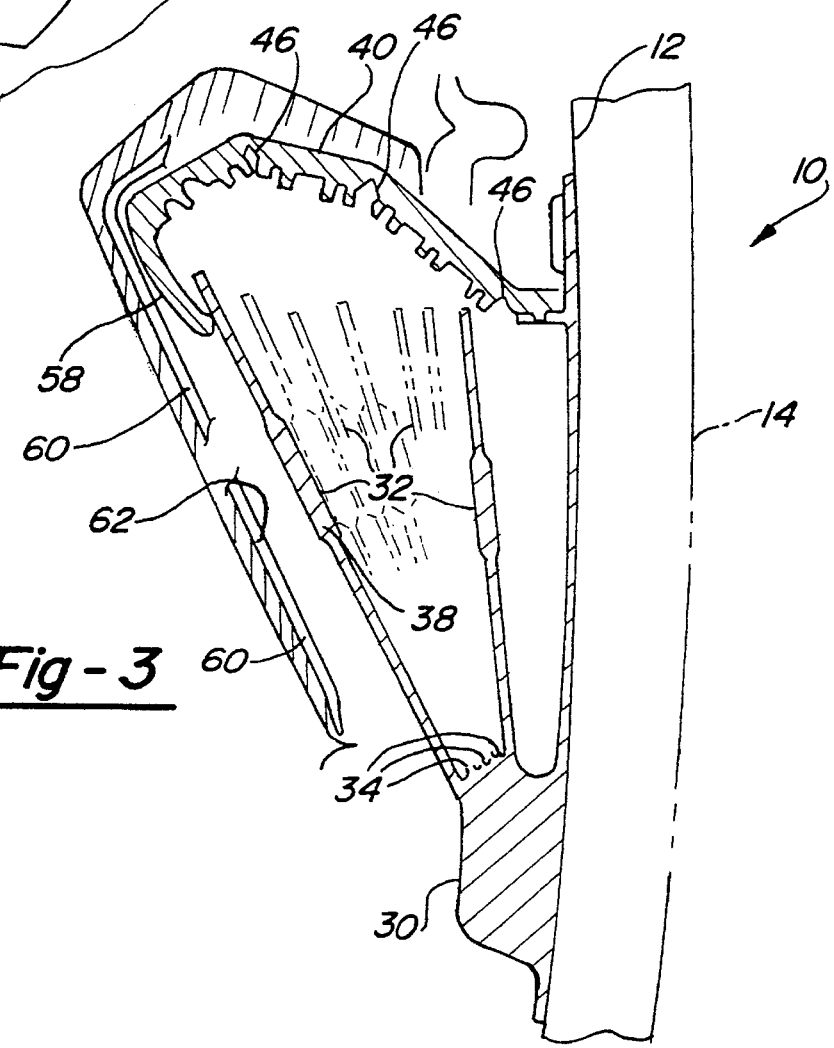
FIG. 3 is view similar to FIG. 2 illustrating the arm rest and arm rest support in a laterally collapsed condition.

Referring now to FIG. 3, the imposition of a large lateral force exerted in the outboard direction, i.e. against the arm rest assembly toward the door outer panel 14, causes the substrate layer 60 to move against the abutment flange 58 and causes the ribs 32 to collapse together and the top plate 40 and arm rest section 19 to fold into a collapsed position. The collapse of the top plate 40 causes buckling upwardly along the break lines 46 and lifts the plate 40 off the distal ends 36 of the ribs to release them and allow them to move outboard.

An alternate embodiment is shown in FIG. 4. In this embodiment an interior door trim panel 118 has a cosmetic skin 164 and foam cushion filler 166 and a lower substrate 160. The substrate has an arm rest section 119 with integrally molded ridges 144 that form grooves 142 that seat the distal ends 36 of ribs 32. The lateral outboard end 150 of arm rest section 119 is constructed to abut directly against the mounting plate 20. This may take the form of a leg 151 that extends to the plate 20. The grooves 142 and ridges 144 provide the same functions as the ridges and grooves in the top plate 40 of the first embodiment to normally seat and retain the ribs 32 in a stable lateral position against flexing.

It is also foreseen that other embodiments can be constructed that have top plate 40 or arm rest substrate section 150 abut directly against inner door panel 12.

In this fashion, the invention provides for a new and improved arm rest construction that is incorporated into the door trim panel and having a concealed support member that permits the arm rest to support the weight of a person when a person stands or lifts himself onto the arm rest. The same support permits the collapse of the arm rest in the during the exertion of large horizontally directed forces against the arm rest.

Variations and modifications are possible without departing from the scope and spirit of the present invention as defined by the appended claims.

The embodiments in which an exclusive property or privilege is claimed are defined as follows:

1. An arm rest assembly for a vehicle door characterized by:

an arm rest support having a section securely mounted via a fastener on said vehicle door and a plurality of laterally spaced ribs upwardly and inwardly extending from said mounted section to distal upper ends laterally spaced with respect to said mounted section and each other;

a door trim panel having an integral arm rest, said door trim panel having a decorative outer surface and a supportive substrate backing; and said integral arm rest positioned about said arm rest support and the distal upper ends of said ribs for vertical support therefrom against downwardly directed forces while providing collapse upon lateral exerted forces.

2. An arm rest assembly as defined in claim 1 further characterized by;

a top plate being seated on the distal upper ends of said spaced ribs;

said top plate abutting against said mounted section of said arm rest support and said vehicle door; and said integral arm rest having a horizontal extending section positioned over and supported by said top plate.

3. An arm rest assembly as defined in claim 2 further characterized by:

said top plate having a plurality of grooves therein that seatably receive the distal upper ends of said spaced ribs.

4. An arm rest assembly as defined in claim 1 further characterized by:

said door trim panel having a structurally rigid substrate;

said substrate having a plurality of grooves therein underlying said integral arm rest;

said plurality of grooves seatably receive the distal upper ends of said spaced ribs; and said door trim panel having a section that abuts against said vehicle door to normally prevent outward motion of said arm rest.

5. An arm rest assembly as defined in claim 1 further characterized by;

said mounting section comprising a mounting plate for mounting on said vehicle door, said mounting plate having a thickened bar section that horizontally extends along a lower section of said plate;

said plurality of laterally spaced ribs being integrally formed with and upwardly extending from said bar.

6. An arm rest assembly as defined in claim 5 further characterized by;

said plurality of ribs fanning out from said bar section such that each rib is angled with respect to another rib;

each rib having its horizontal axis extending substantially parallel to said mounting plate.

7. An arm rest assembly as defined in claim 6 further characterized by:

a top plate being seated on the distal upper ends of said spaced ribs;

said top plate abutting against said mounted section of said arm rest support and said vehicle door; and said integral arm rest having a horizontal extending section positioned over and supported by said top plate.

8. An arm rest assembly as defined in claim 7 further characterized by:

said top plate having a plurality of grooves therein that seatably receive the distal upper ends of said spaced ribs.

9. An arm rest assembly as defined in claim 7 further characterized by;

said arm rest support being an extruded plastic.

10. An arm rest assembly as defined in claim 6 further characterized by:

said door trim panel having a structurally rigid substrate;

said substrate having a plurality of grooves therein underlying said integral arm rest;

said plurality of grooves seatably receive the distal upper ends of said spaced ribs; and said door trim panel having a section that abuts against said vehicle door to normally prevent outward motion of said arm rest.

11. An arm rest support for a vehicle door characterized by:

an arm rest support member having a mounting plate for mounting on a door panel, said mounting plate having a thickened bar section that horizontally extends along a lower section of said mounting plate;

a plurality of laterally spaced ribs upwardly extending from said bar section to laterally spaced distal upper ends;

said plurality of ribs fanning out from said bar section such that each rib is angled with respect to another rib; and each rib having its horizontal axis extending substantially parallel to said mounting plate.

12. An arm rest support as defined in claim 11 further characterized by;

a top plate being seated on the distal upper ends of said spaced ribs.

13. An arm rest support as defined in claim 12 further characterized by:

said top plate having a plurality of grooves therein that seatably receive the distal upper ends of said spaced ribs.

14. An arm rest support as defined in claim 12 further characterized by;

said arm rest support being an extruded plastic.

15. An arm rest support as defined in claim 11 further characterized by;

said plurality of ribs fanning out from said bar section such that each rib is angled with respect to another rib;

each rib having its horizontal axis extending substantially parallel to said mounting plate.

16. An arm rest support as defined in claim 11 further characterized by:

said arm rest support being an extruded plastic.

17. An arm rest support for a vehicle door characterized by:

a plurality of ribs having proximate ends integrally formed and connected together;

said plurality of ribs fanning out from said proximate ends such that each rib is angled with respect to another rib;

said ribs having upper distal ends spaced apart from each other;

each respective rib having a respective horizontal axis extending substantially parallel to each other; and said arm rest support being constructed for rigid affixation within an arm rest to a vehicle door.

18. An arm rest support as defined in claim 17 further characterized by;

a top plate being seated on the distal upper ends of said ribs.

19. An arm rest support as defined in claim 18 further characterized by:

said top plate having a plurality of grooves therein that seatably receive the distal upper ends of said spaced ribs.

* * * * *